July 2, 1935.  C. H. HAPGOOD  2,006,393
APPARATUS FOR DELIVERING MILK TO CANS
Filed March 16, 1933   3 Sheets-Sheet 3

WITNESS:

INVENTOR
Cyrus Howard Hapgood
BY
Busser and Harding
ATTORNEYS.

Patented July 2, 1935

2,006,393

UNITED STATES PATENT OFFICE 2,006,393

APPARATUS FOR DELIVERING MILK TO CANS

Cyrus Howard Hapgood, Nutley, N. J., assignor to The De Laval Separator Company, New York, N. Y., a corporation of New Jersey Application March 16, 1933, Serial No. 661,073

5 Claims. (Cl. 226—116)

My invention is applicable to that type of milking machine wherein the milk from the cows is discharged, usually through separate pails, into a common milk discharge pipe line. The object of the invention is to provide simple and inexpensive means whereby the milk discharged through this pipe line may be discharged direct into the cans or pails in which the milk is shipped. The invention contemplates the filling of an indefinite number of cans. The operation of my invention, however, involves the necessary employment, as a part of the apparatus, of only two cans at a time, one of which receives the milk until it is filled, whereupon the flow will be diverted, automatically or manually, to the second can, which receives the flow of the milk during the operation of removing of the filled can and replacing it by a third empty can. Thereafter the flow of milk may be diverted to the third can, and the second can utilized, as before, to receive milk only after the third can is filled; or alternatively, the milk may be allowed to continue to flow into the second can until it is filled, whereupon the flow may be diverted, automatically or manually, to the third can. In larger installations it may be desirable to at all times simultaneously associate three cans with the milking apparatus, so as to provide ample capacity for receiving milk while filled cans are being removed and replaced.

Figure 1:
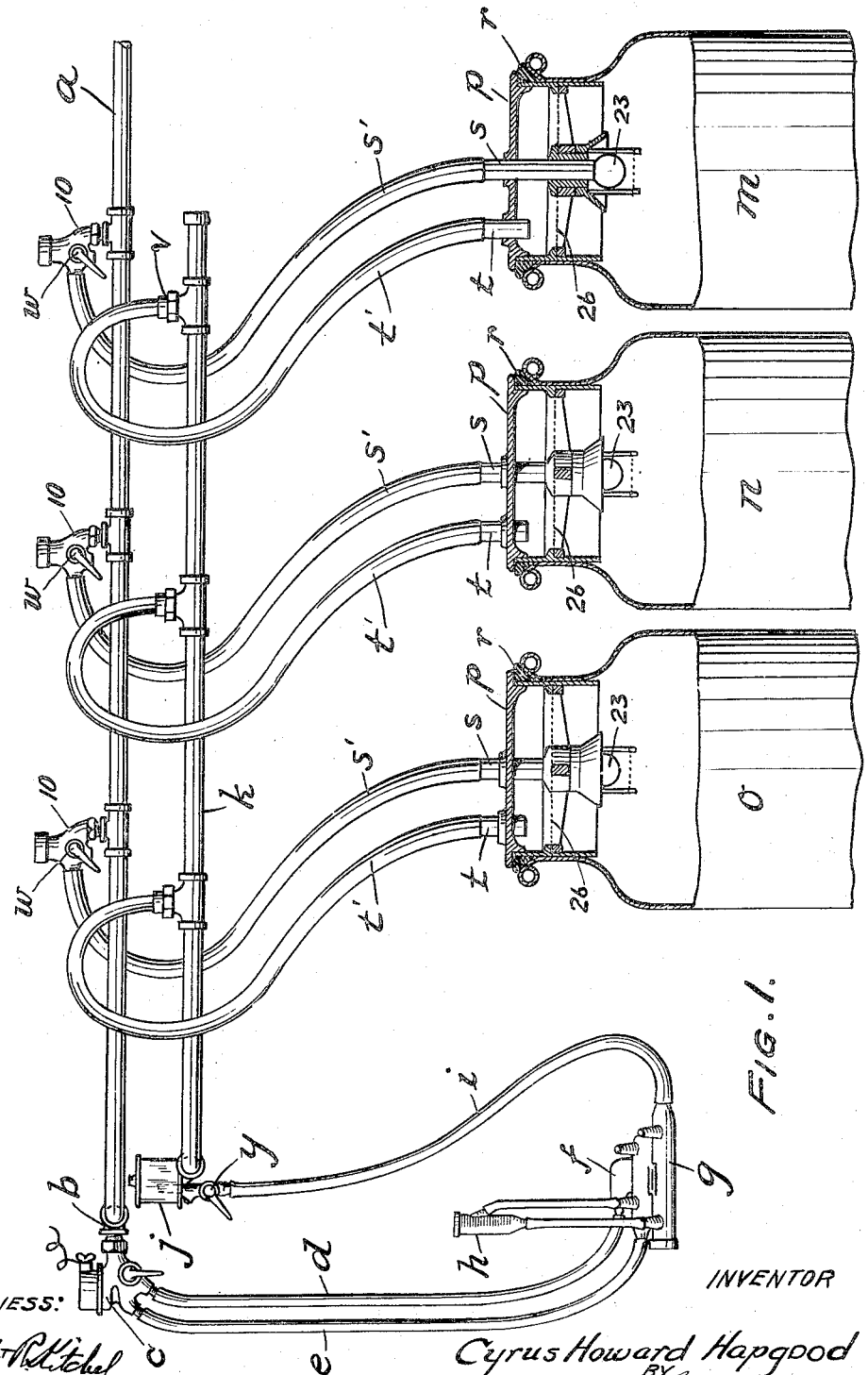
Fig. 1 is a side elevation (the milk cans being shown mainly in section) of a milking machine installation embodying my invention.

In Figure 1 the invention is shown as applied to a milking machine installation comprising a vacuum pipe line $a$ so connected with the milking mechanism as to produce the desired suction and pneumatic pulsations, and a milk pipe line through which milk from the milking mechanism is transmitted to the milk cans.

Preferred operative connections between these pipe lines and the milking mechanism form no part of the present invention and may be briefly described as follows:

Along the vacuum pipe line $a$ are mounted any number of T's $b$, to any of which is attached a connector $c$ connected with a vacuum hose $d$ and a pneumatic pulsation hose $e$. The connector $c$ is ported to connect vacuum hose $d$ with the vacuum line $a$ and carries a magnetically operable pneumatic pulsation valve (not shown) whereby pulsation hose $e$ is connected alternately with the vacuum pipe line $a$ and with atmosphere.

The hose $d$ and $e$ connect with the valve chamber $f$ of a claw, the operation of the valve in this chamber being controlled by the pulsations in hose $e$ and producing pulsations in the outer or pulsation chambers of the teat cups $h$. The inner or milk chambers of the teat cups communicate, through the milk chamber $g$ of the claw, with the milk hose $i$ extending to and communicating with a sight cup $j$ communicating with a milk discharge pipe line $k$. The milk hose $i$ may communicate with a milk pail (not shown), from which milk may be transferred to the milk line $k$, as disclosed, for example, in the Hapgood Patent No. 1,846,805, dated February 23, 1932.

Positioned along the milk pipe line $k$ are any number (at least two) milk cans or receivers. Three are shown and are $m$, $n$ and $o$. Each milk can has a removable lid, top or cover $p$ provided with a circumferential rubber gasket $r$ adapted to engage the outwardly rolled top of the neck of the can body, whereby the top may have an air-tight engagement with the can body. Extending through each top $p$ are tubes, $t$ and $s$, one connected, by means of a hose $t'$ with a T interposed in the milk pipe line $k$, and the other connected, by means of a hose $s'$, with the vacuum pipe line $a$. The hose $t'$ will desirably rise to point substantially above the level of the milk pipe line $k$, as shown in Fig. 1.

Figures 4, 5:
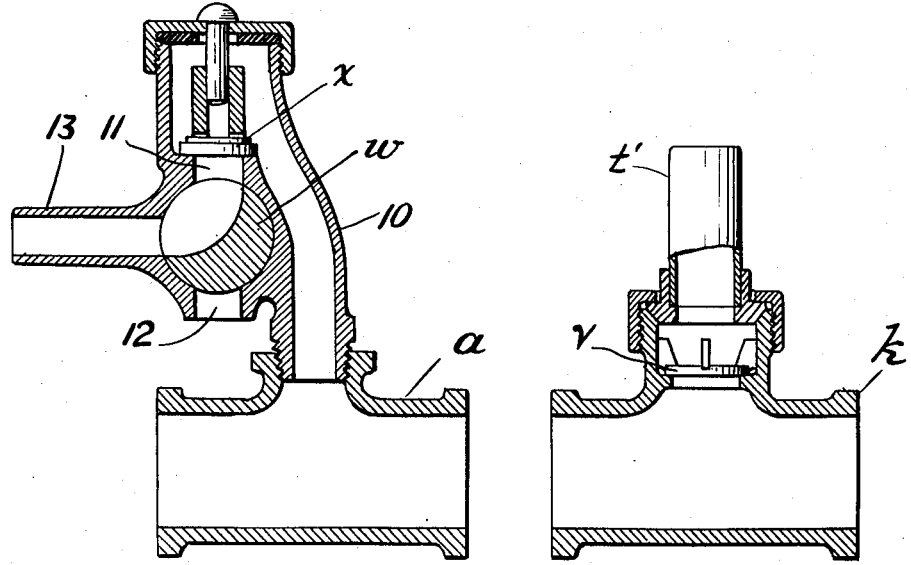
Fig. 4 is an enlarged detail sectional view of the valve mechanism at the junction of the vacuum pipe line and the air hose connected with a milk can.
Fig. 5 is an enlarged detail sectional view of the check valve at the junction of the milk pipe line and the milk hose connected with a milk can.

Within the lateral nipple of each T in the milk pipe line is a check valve $v$, as shown in Fig. 5, which serves to prevent the entrance of air into the milk pipe line when the associated can is opened to the atmosphere.

The connection between each hose $s'$ and the vacuum pipe line $a$ is not, preferably, direct, but each hose $s'$ is connected with vacuum pipe $a$ through a valve mechanism, one of which is shown in detail in Fig. 4. In this figure is shown, mounted on pipe $a$, a casing 10, which is shaped to provide a passage extending upward from the pipe $a$ and is enlarged at the top and there provided with a downwardly extending port 11 communicating with a chamber in which a valve $w$ is turnable. The valve chamber has two other ports, namely, an atmospheric port 12 and a port opening into a nozzle 13, to which the hose $s'$ is connected. The valve $w$ is so ported that when moved into one position it connects nozzle 13 with vacuum port 11 and when moved into the other position it connects nozzle 13 with atmospheric port 12. A check valve $x$ is seated on port 11 and insures complete closure of port 11 except when valve $w$ is in position to connect port 11 with nozzle 13 and the pressure in nozzle 13 is greater than in vacuum pipe $a$.

Carried at the lower end of air tube $s$ is a nipple 20 screw threaded to receive a conical skirt 21 adapted to deflect any milk that otherwise might splash laterally and be carried out the vacuum tube $s$. Applied to the lower end of the nipple is a rubber ring 22 affording a seat for a ball valve 23. This valve normally rests on a rubber strap 24 encircling three pins 25 depending from the cone 21, but is adapted to float up against the valve seat 22 when the milk accumulates in the can to the desired level, whereby the connection of the milk can with vacuum is shut off and inflow of milk through tube $t$ arrested.

An annular screen 26, with an overlying filter cloth, extends between tube $s$ and the depending flange of the can top $p$. The screen is held against an annular projection on the nipple 20 and a ring 27 on the inner wall of the flange of the can top by means of a spider 29, the hub of which is declamped against the screen by means of a nut on the skirt 21.

In normal operation a valve cock $y$ on milk hose $i$ is opened and milk flows from hose $i$ into the milk pipe line $k$. The milk, flowing along the level milk pipe line $k$ in preference to rising in the hoses $t'$ will flow to the end of the line and then rise and flow selectively through the hose $t'$ associated with the most remote can $m$, even though the valves $w$ in all the valve casings 10 are opened to vacuum. Once the flow into can $m$ is started, the milk will continue to flow into this can to the exclusion of the others until it is filled and valve 23 operates, for the force tending to cause it to flow into can $m$ is that of the vacuum plus that of the weight of milk in the longer arm of the associated hose $t'$ which acts as a siphon, while the force tending to cause it to flow into the other cans is only that of the vacuum. However, all the valves $w$ in valve casings 10, except the one controlling the connection to milk can $m$ may be opened to atmosphere, so that only can $m$ will be connected with vacuum.

When the milk in can $m$ reaches a predetermined level, the floating ball valve 23 therein seats against ring 22, thereby closing communication between can $m$ and vacuum pipe $a$. While milk is flowing through hose $t'$ into can $m$, the hose visibly vibrates, and when milk ceases to flow therethrough, the operator will be readily apprised thereof by the cessation of that vibration. If the valve $w$ controlling the connection between vacuum pipe $a$ and can $n$ is open to vacuum, the flow of milk will be automatically diverted to that can. The operator then closes the valve $w$ that connects vacuum pipe $a$ with the hose $s'$ of can $m$ and removes the top $p$ from can body $m$. The can body $m$ is then removed. It may have applied to it an ordinary can top or cover and another empty can substituted for the filled can; or the filled can may be emptied and replaced. During this operation milk continues to flow into can $n$ and this flow may be allowed to continue until can $n$ is filled, whereupon the flow of milk will be automatically diverted into can $o$. In the simplest embodiment of my invention, however, there may be provided only two cans. One can, e. g. can $n$, merely receives the milk flow while the other can, $m$, is being removed and replaced; the normal flow of milk being always into a can $m$.

Figure 2:
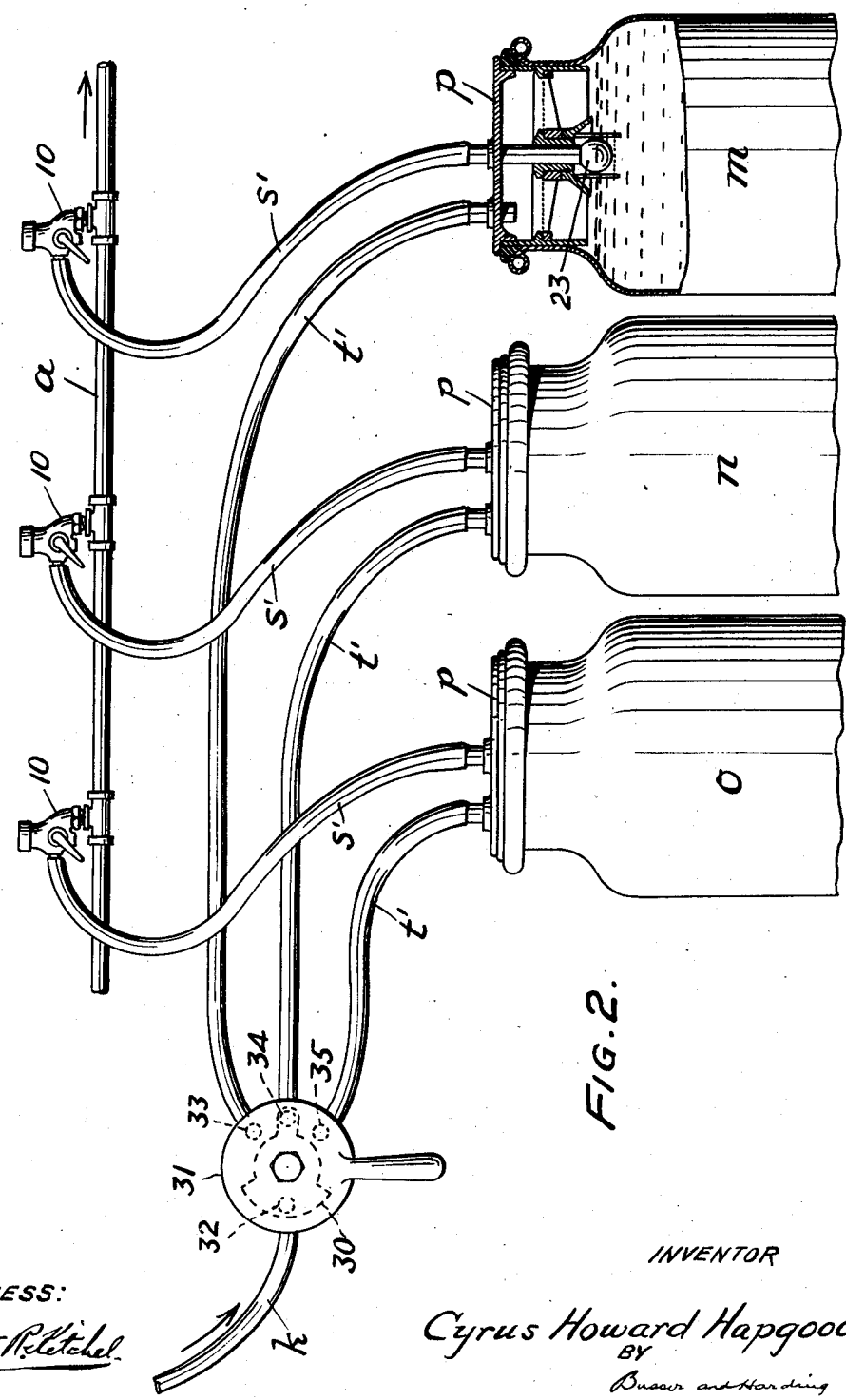
Fig. 2 is a view, similar to Fig. 1, of a modification.
Figure 3:
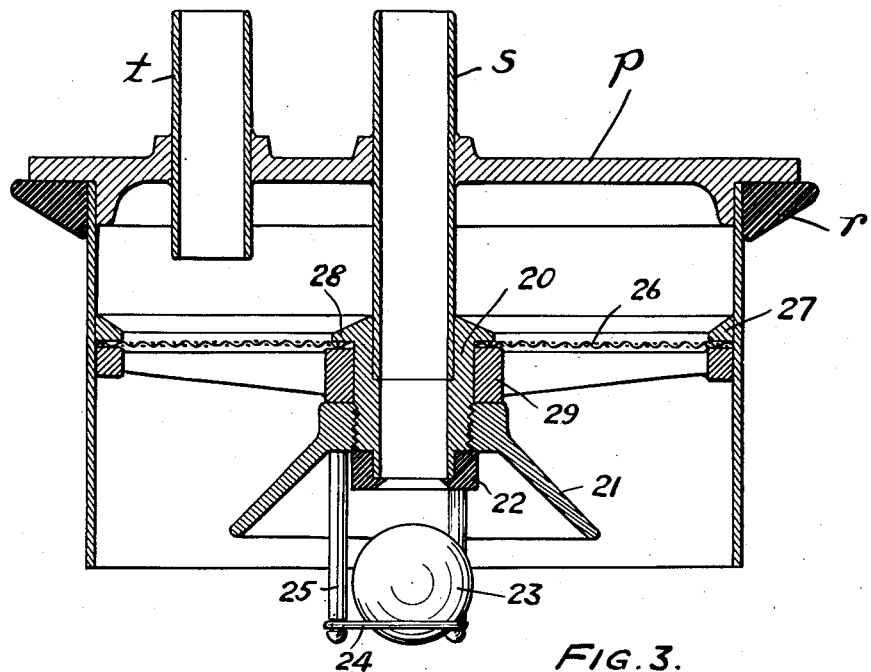
Fig. 3 is an enlarged vertical sectional detail view of a milk can cover and its appurtenant parts.

The diversion of milk from one can to another need not be automatic, but may be manually controlled, as in the arrangement shown in Fig. 2. The three cans $m$, $n$ and $o$ and their covers $p$ may have the construction hereinbefore described in describing the arrangement of Fig. 1 and they may be similarly connected with the vacuum tube $a$. The three milk hose $t'$, $t'$, $t'$, however, may connect respectively with three ports 33, 34 and 35 in a valve casing 31. This valve casing may also have a port 32 connected with the terminus of the milk pipe line $k$. Within the valve casing is a hollow valve 30 which may be turned to connect port 32 with either of the ports 33, 34 or 35. When ports 32 and 33 are connected, milk flows into can $m$. When can $m$ is disconnected from vacuum by the seating of its ball valve 23, the operator moves valve 30 into the position shown in Fig. 2, thereby connecting the milk pipe line $k$ with can $n$.

In a patent issued to me February 23, 1932, No. 1,846,805, there are shown twin releasers into which milk is delivered, through a milk pipe, from milk receivers or pails to which the milk is delivered from individual cows, the milk being delivered from the pails after the individual cow milking operations are completed. When such a system, known as the accumulating system, is operated with a releaser, it must be equipped with a type of releaser that cannot be flooded; this because of the large quantities of milk periodically transferred through the milk pipe. Releasers of this type, so far used, have, of necessity, comparatively small air passages, which results in a varying, and at times a very low, vacuum in the milk pipe. The changing from filling to dumping periods of the releaser increases this vacuum variability.

This variation of vacuum in the milk pipe of an accumulating system is, however, of no moment, as the milk pipe is for milk transfer only. Where, however, the milk flows direct from the teat cups through the milk pipe, as illustrated in Fig. 1, the described variation in vacuum would make it inoperative. During the periods of low vacuum the teat cups would fall off the cows and milking would stop until the required conditions were re-established. It is believed that, with this system of milking, no type of releaser will operate at all except the so-called spitting releaser, which affords free passage of air from the end of the milk pipe to the vacuum pipe, thus maintaining a comparatively constant vacuum in the milk line. But such type of releaser is open to a number of serious objections, among which are aeration of the milk and the necessity for large vacuum pump capacity.

The can-filling system herein described provides a free passage of air from the milk pipe to the vacuum pipe, but each unfilled can in use provides such a passage. Moreover, if the operator is negligent and does not remove filled cans, the milk does not flood over into the vacuum pipe and possibly the vacuum pump, but instead the vacuum connections to the milk pipe are closed and milking stops.

While the invention is of special advantage when milking direct from the cow into the milk pipe, it is also successfully operative and of substantial advantage when applied to the accumulating system.

What I claim and desire to protect by Letters Patent is:

1. A continuous delivery system for filling a plurality of milk cans comprising a source of milk, a milk pipe leading therefrom, a vacuum pipe, a plurality of covers adapted to hermetically close said milk cans, air conduits connected with the vacuum pipe and extending through the respective covers, whereby all the milk cans may open to vacuum during delivery of the milk, milk conduits connected with the milk pipe at increasing distances from the source of milk and extending through the respective covers, said milk conduits being so constructed as to cause a selective flow of milk through the conduit farthest from the source of milk to the exclusion of the remaining conduits so long as the milk can associated with said farthest conduit is open to vacuum, a valve associated with each of said covers and operable by the rising column of milk in the respective cans to close communication between such can and the vacuum pipe upon the filling of the can to a predetermined level, whereupon the milk automatically flows through the milk conduit next farthest from the source of milk into the can associated therewith, and hand-operable valves associated with the respective air conduits, said valves being independently movable to connect a plurality of cans simultaneously with the vacuum pipe, each of valves being movable to connect the corresponding air conduit with atmosphere preparatory to the removal of a filled can.

2. A continuous delivery system for filling a plurality of milk cans comprising a source of milk, a milk pipe leading therefrom, a vacuum pipe, a plurality of covers adapted to hermetically close said milk cans, air conduits connected with the vacuum pipe and extending through the respective covers, whereby all the milk cans may open to vacuum during delivery of the milk, milk conduits connected with the milk pipe at increasing distances from the source of milk and extending through the respective covers, said milk conduits including a section rising to a level substantially above the level of the milk pipe, whereby the milk flows selectively through the conduit farthest from the source of milk to the exclusion of the remaining conduits so long as the milk can associated with said farthest conduit is open to vacuum, a valve associated with each of said covers and operable by the rising column of milk in the respective cans to close communication between such can and the vacuum pipe upon the filling of the can to a predetermined level, whereupon the milk automatically flows through the milk conduit next farthest from the source of milk into the can associated therewith, and hand-operable valves associated with the respective air conduits, said valves being independently movable to connect a plurality of cans simultaneously with the vacuum pipe, each of valves being movable to connect the corresponding air conduit with atmosphere preparatory to the removal of a filled can.

3. A continuous delivery system for filling a plurality of milk cans comprising a source of milk, a milk pipe leading therefrom, a vacuum pipe, a plurality of covers adapted to hermetically close said milk cans, air conduits connected with the vacuum pipe and extending through the respective covers, whereby all the milk cans may open to vacuum during delivery of the milk, milk conduits connected with the milk pipe at increasing distances from the source of milk and extending through the respective covers, said milk conduits beng so constructed as to cause a selective flow of milk through the conduit farthest from the source of milk to the exclusion of the remaining conduits so long as the milk can associated with said farthest conduit is open to vacuum, a valve associated with each of said covers and operable by the rising column of milk in the respective cans to close communication between such can and the vacuum pipe upon the filling of the can to a predetermined level, whereupon the milk automatically flows through the milk conduit next farthest from the source of milk into the can associated therewith, hand-operable valves associated with the respective air conduits, said valves being independently movable to connect a plurality of cans simultaneously with the vacuum pipe, each of valves being movable to connect the corresponding air conduit with atmosphere preparatory to the removal of a filled can, and a check valve between each milk conduit and the milk pipe, adapted, when a filled can is opened to the atmosphere, to close communication between the milk pipe and the corresponding milk conduit.

4. A continuous delivery system for filling a plurality of milk cans comprising a source of milk, a milk pipe leading therefrom, a vacuum pipe, a plurality of covers adapted to hermetically close said milk cans, air conduits connected with the vacuum pipe and extending through the respective covers, whereby all the milk cans may open to vacuum during delivery of the milk, milk conduits connected with the milk pipe at increasing distances from the source of milk and extending through the respective covers, said milk conduits including a section rising to a level substantially above the level of the milk pipe, whereby the milk flows selectively through the conduit farthest from the source of milk to the exclusion of the remaining conduits so long as the milk can associated with said farthest conduit is open to vacuum, a valve associated with each of said covers and operable by the rising column of milk in the respective cans to close communication between such can and the vacuum pipe upon the filling of the can to a predetermined level, whereupon the milk automatically flows through the milk conduit next farthest from the source of milk into the can associated therewith, hand-operable valves associated with the respective air conduits, said valves being independently movable to connect a plurality of cans simultaneously with the vacuum pipe, each of valves being movable to connect the corresponding air conduit with atmosphere preparatory to the removal of a filled can, and a check valve between each milk conduit and the milk pipe, adapted, when a filled can is opened to the atmosphere, to close communication between the milk pipe and the corresponding milk conduit.

5. A continuous delivery system for filling a plurality of milk cans comprising a source of milk, a milk pipe leading therefrom, a vacuum pipe, a plurality of covers adapted to hermetically close said milk cans, air conduits connected with the vacuum pipe and extending through the respective covers, whereby all the milk cans may open to vacuum during delivery of the milk, milk conduits connected with the milk pipe at increasing distances from the source of milk and extending through the respective covers, said milk conduits being so constructed as to cause a selective flow of milk through a single conduit to the exclusion of the remaining conduits so long as the milk can associated with said conduit is open to vacuum, a valve assocated with each of said covers and operable by the rising column of milk in the respective cans to close communication between such can and the vacuum pipe upon the filling of the can to a predetermined level, whereupon the milk automatically flows through the milk conduit next in series into the can associated therewith, and hand-operable valves associated with the respective air conduits, said valves being independently movable to connect a plurality of cans simultaneously with the vacuum pipe, each of valves being movable to connect the corresponding air conduit with atmosphere preparatory to the removal of a filled can.

CYRUS HOWARD HAPGOOD.